(12) United States Patent
Takafuji et al.

(10) Patent No.: US 7,236,866 B2
(45) Date of Patent: Jun. 26, 2007

(54) VEHICULAR COLLISION OBJECT DETERMINING SYSTEM

(75) Inventors: Tetsuya Takafuji, Anjo (JP); Yoshiyuki Hattori, Toyoaki (JP); Hiroyuki Takahashi, Nishikamo-gun (JP); Ryotaro Kachu, Nishikamo-gun (JP); Yujiro Miyata, Kariya (JP); Motomi Iyoda, Seto (JP)

(73) Assignees: Denso Corporation, Kariya (JP); Toyota Jidosha Kabushiki Kaisha, Aichi-ken (JP)

( * ) Notice: Subject to any disclaimer, the term of this patent is extended or adjusted under 35 U.S.C. 154(b) by 301 days.

(21) Appl. No.: 10/950,444

(22) Filed: Sep. 28, 2004

(65) Prior Publication Data

US 2005/0096816 A1 May 5, 2005

(30) Foreign Application Priority Data

Oct. 29, 2003 (JP) ............................. 2003-369477
Apr. 28, 2004 (JP) ............................. 2004-134451

(51) Int. Cl.
*B60R 21/00* (2006.01)
(52) U.S. Cl. ................. 701/45; 701/301; 340/436; 280/735; 180/168

(58) Field of Classification Search ............ 701/45–47, 701/301, 36, 96; 340/435, 436, 438; 280/734, 280/735, 728.1; 180/167–168
See application file for complete search history.

(56) References Cited

U.S. PATENT DOCUMENTS

| 6,510,914 B2 | 1/2003 | Ishizaki et al. |
| 6,516,278 B1 | 2/2003 | Ishizaki et al. |
| 6,561,301 B1 | 5/2003 | Hattori et al. |
| 7,024,293 B2 * | 4/2006 | Ishizaki et al. ............ 701/45 |
| 2005/0021192 A1 | 1/2005 | Takafuji et al. |

FOREIGN PATENT DOCUMENTS

| EP | 1442943 | 8/2004 |
| JP | A-H11-28994 | 2/1999 |
| WO | WO 2004/069606 A1 | 8/2004 |

* cited by examiner

*Primary Examiner*—Y. Beaulieu
(74) *Attorney, Agent, or Firm*—Posz Law Group, PLC

(57) ABSTRACT

From a collision load, a one-time integration value and a two-time integration value are computed. The one-time integration value and two-time integration value are then used for obtaining a mass and rigidity of a collision object as two primary parameters. The obtained two primary parameters are used for determining whether or not the collision object is a pedestrian. This achieves accuracy in determining the collision object that is remarkably superior to a conventional method that uses a collision load waveform.

26 Claims, 9 Drawing Sheets

VEHICULAR COLLISION OBJECT DETERMINING SYSTEM

CROSS REFERENCE TO RELATED APPLICATIONS

This application is based on and incorporates herein by reference Japanese Patent Applications No. 2003-369477 filed on Oct. 29, 2003, and No. 2004-134451 filed on Apr. 28, 2004.

FIELD OF THE INVENTION

The present invention relates to a vehicular collision object determining system that determines an object that collides with a vehicle.

BACKGROUND OF THE INVENTION

An invention of lifting a hood of a vehicle or a technology of disposing an airbag on the hood is proposed for decreasing an impact that is suffered by a head of a pedestrian when the vehicle collides with the pedestrian. In adopting the invention or technology, various adverse influences result from operating a protecting device on the hood (e.g., active hood) when a collision object is not a pedestrian.

For instance, when a vehicle collides with a light object that is not discriminated from a pedestrian, such as a triangle corn or a signboard indicating road construction, the protecting device is uselessly operated. This involves a useless repair cost. Further, by contrast, when a vehicle collides with a heavy stationary object that is not discriminated from a pedestrian, such as a concrete wall or another vehicle, a problem occurs that the hood being lifted is backed into an interior of the vehicle.

Accurately determining whether a collision object is a pedestrian is thereby more required than before, so that several methods for determining the collision object are proposed. For instance, a first method (Patent document 1) uses a collision load (or deformation amount), duration of the collision load, and a vehicle speed. A second method (Patent document 2) uses a deformation amount at a collision timing (corresponding to collision load), a time-series variation of the deformation amount, and a vehicle speed. In the two methods, a pedestrian is discriminated from other collision objects by setting a threshold in the load, variation amount, and time.

(Patent document 1: JP-H11-028994 A)

(Patent document 2 JP-H11-310095 A (U.S. Pat. No. 6,561,301 B1))

However, it was known that these methods that simply utilize collision load waveforms involve insufficient determination accuracy, resulting in insufficient reliability, regardless of a lot of workloads for experiments. Here, the experiments are required for specifying the threshold for the time and load (variation amount) with respect to each of various vehicle speeds.

Collision objects have individual shapes and rigidity. Even when each of the collision objects has an equal speed and an equal mass, a waveform of a collision load F (=ma) is thereby variable. As a result, a characteristic of the collision load waveform such as duration of the collision load, an increasing ratio, or a peak value cannot easily nor accurately discriminate a pedestrian from the other objects.

SUMMARY OF THE INVENTION

It is an object of the present invention to provide a vehicular collision object determining system that has, in determining a pedestrian, accuracy higher than that of a conventional method.

To achieve the above object, a vehicular collision object determining system mounted on a vehicle is provided with the following. A collision load sensor detects a collision load. A speed sensor detects a vehicle speed of the vehicle. A computing unit computes at least one of a mass and rigidity of a collision object based on at least outputs from the collision load sensor and the speed sensor. A determining unit determines whether the collision object is a pedestrian or not based on the at least one of the mass and the rigidity of the collision object.

In this structure, a mass or rigidity of a collision object is computed based on at least a collision load (including information correlated with the collision load) and a vehicle speed. The mass or rigidity is an important parameter as a characteristic of the collision object, so that it is used for determining the collision object. Even an object resembling a pedestrian can be thereby discriminated from the pedestrian, which provides a high accurate determining system.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
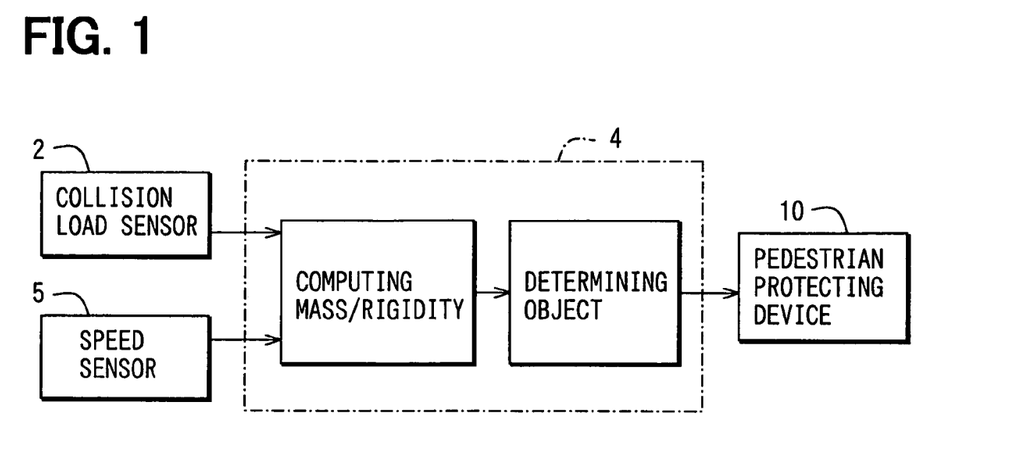
FIG. 1 is a block diagram showing a vehicular collision object determining system according to a first embodiment of the present invention.
Figure 2:
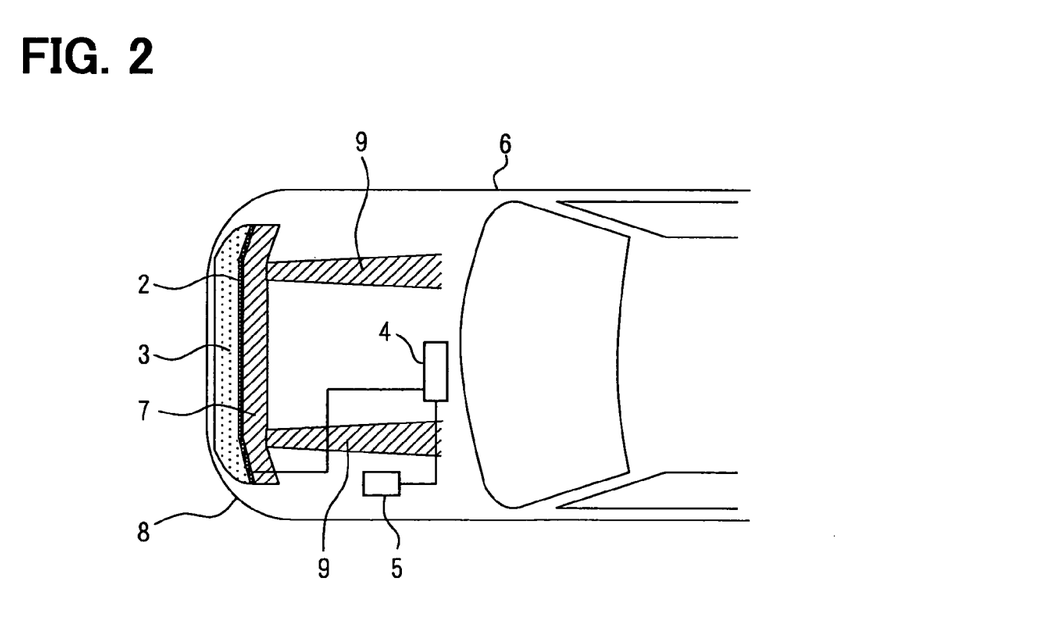
FIG. 2 is a schematic perspective view of a vehicle having a vehicular collision object determining system of the first embodiment.
Figure 3:
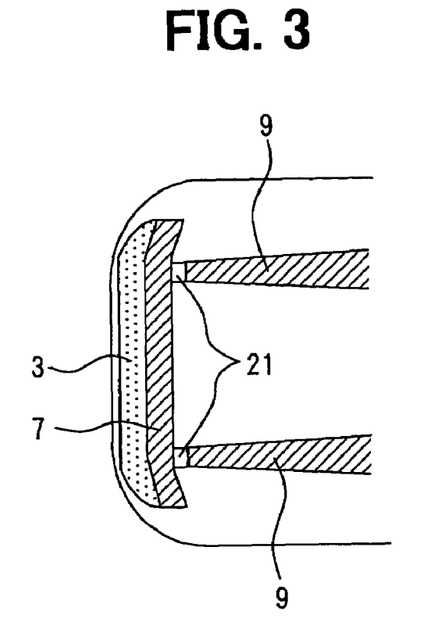
FIGS. 3 to 6 are schematic plan views showing examples of a collision load sensor in the vehicular collision object determining system of the first embodiment.
Figure 4:
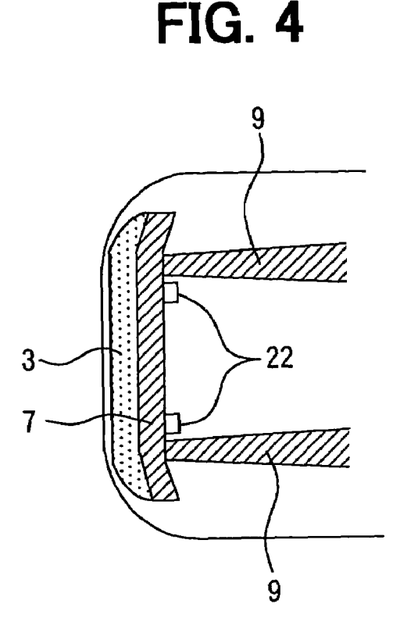

A structure of a vehicular collision object determining system mounted on a vehicle according to a first embodiment of the present invention will be explained with reference to FIGS. 1, 2. The vehicle includes a collision load sensor 2, a bumper absorber 3, a controller 4 for computing and determining, a wheel speed sensor 5 as a vehicle speed sensor, a side member 9, a bumper cover 8, and a vehicle body 6. Here, the bumper cover 8, the bumper absorber 3, and the bumper reinforcement 7 mainly constitute a bumper of the vehicle. The controller 4 outputs collision-related information to an occupant protecting device or a pedestrian protecting device 10 based on outputs from the sensors. This collision-related information includes as least whether a collision object is a pedestrian or not.

The collision load sensor 2 outputs analog signal voltage corresponding to a collision load. The collision load sensor 2 is disposed as being extended, in a vehicle-width direction (in a side to side direction of the vehicle), on a rear surface of a bumper absorber 3 that is also disposed as being extended in a vehicle-width direction in front of a bumper reinforcement 7. The bumper reinforcement 7 is disposed in a vehicle-width direction in a forward portion of the vehicle body 6.

Figure 5:
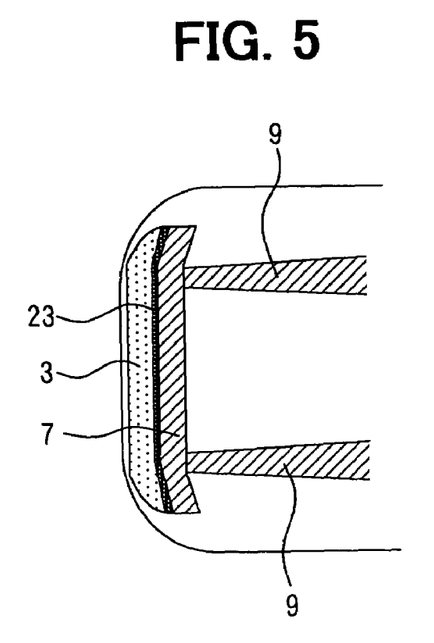
Figure 6:
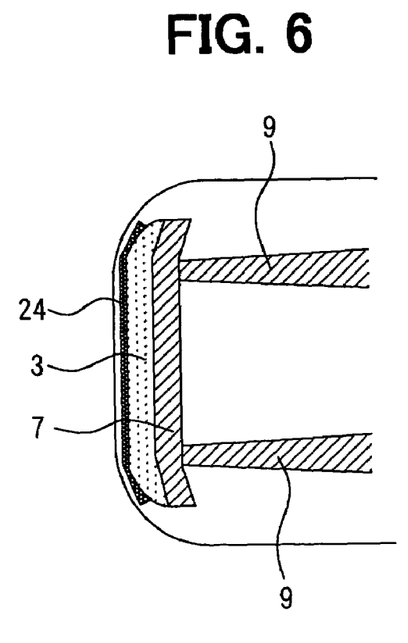

The collision load sensor 2 only needs to generate an output signal corresponding to a collision load, so that various structures shown in FIGS. 3 to 6 can be selectable. For instance, a rubber tube internally accommodating a pressure sensor can be disposed in a vehicle-width direction. When a collision occurs, the rubber tube is compressed to increase internal pressure, which is then detected by a pressure sensor. The collision load can be detected by an acceleration sensor 22 or a load sensor 21. Namely, the collision load sensor 2 can include as follows: a load sensor 21 that is disposed between a bumper reinforcement 7 and a side member 9 (in FIG. 3); an acceleration sensor 22 that is disposed in a bumper reinforcement 7 or a side member 9 for detecting an acceleration at a collision (FIG. 4); a thin-film-type surface-pressure sensor 23 or a contact-type switch sensor that is disposed on a surface of a reinforcement 7, side member 9, or bumper cover 8 for detecting individual surface pressure at a collision; and a deformation sensor 24 that is disposed in an absorber 3 or bumper cover 8 for detecting deformation at a collision (FIG. 6). The thin-film-type surface-pressure sensor 23 can be disposed as being extended in a vehicle-width direction along the front surface of a bumper reinforcement 7 (FIG. 5). For instance, the thin-film-type surface-pressure sensor 23 is constructed of a pair of electrode lines that are disposed as being extended in a vehicle-width direction with a given gap therebetween, and a carbon-containing rubber film that is disposed between the pair of the electrode lines. When a collision load is applied to the rubber film, the rubber film is compressed in a forward-backward direction. An electric resistance of the rubber film is thereby decreased in the forward-backward direction of the vehicle (film's thickness direction). The collision load is eventually detected by detecting the electric resistance between the two electrode lines. Detecting the collision load (or impact) by the acceleration sensor 22 or collision load sensor 2 is already known, so that explanation is eliminated here. In particular, a load sensor 21 can detect the collision load without loss when the load sensor 21 is disposed in front of a bumper reinforcement 7 or between a bumper reinforcement 7 and side member 9.

Pedestrian Determining Example 1

A pedestrian determining method using the above-described collision load will be explained with reference to a flow chart diagram in FIG. 7.

At Step S100, a collision load F(t) is read. At Step S102, it is determined whether the collision load F(t) exceeds a certain threshold Tth0 indicating a collision occurrence. When it is determined to be exceeding, an internal timer T1 is initialized and individual internal registers (or memory) are reset to zero at Step S104. Here, the internal registers store a one-time integration value, a two-time integration value, and a maximum load value, respectively. A count value of the timer T1 is incremented (or accumulated) every a given short sampling interval T.

Next, at Steps S106, S108, a vehicle speed V and a this-time collision load F(T1) are read, respectively. At Step S110, a one-time integration value is computed. The this-time collision load F(T1) represents a collision load F(t) when the count time of the timer T1 is T1. The one-time integration value of the collision load is computed by adding up the previous one-time integration value and the product from multiplying the this-time collision load F(T1) that is read at Step S108 by the given sampling interval T.

Next, at Step S112, a two-time integration value is computed. The two-time integration value of the collision load is computed by adding up the previous two-time integration value and a product from multiplying the one-time integration value F(T1) that is computed at Step S110 by the given sampling interval T.

At Step S114, a count value T1 of the timer T1, one-time integration value, and two-time integration value are stored in the internal registers, respectively. At Step S116, it is determined whether the this-time collision load F(T1) read at Step S108 exceeds the maximum load Fmax. When it is determined to be exceeding, the collision load F(T1) is stored as the maximum value at Step S118. When it is determined to be not exceeding, Step S118 is skipped; then, it is determined whether the this-time collision load F(T1) decreases to the threshold value Fth0 at Step S120. When the this-time collision load F(T1) is determined to be not decreasing to the threshold value Fth0, the timer T1 is incremented by the sampling interval T when the sampling interval T elapses at Step S122. The process then returns to Step S108. When the this-time collision load F(T1) is determined to be decreasing to the threshold value Fth0, the process advances to Step S124.

Figure 8:
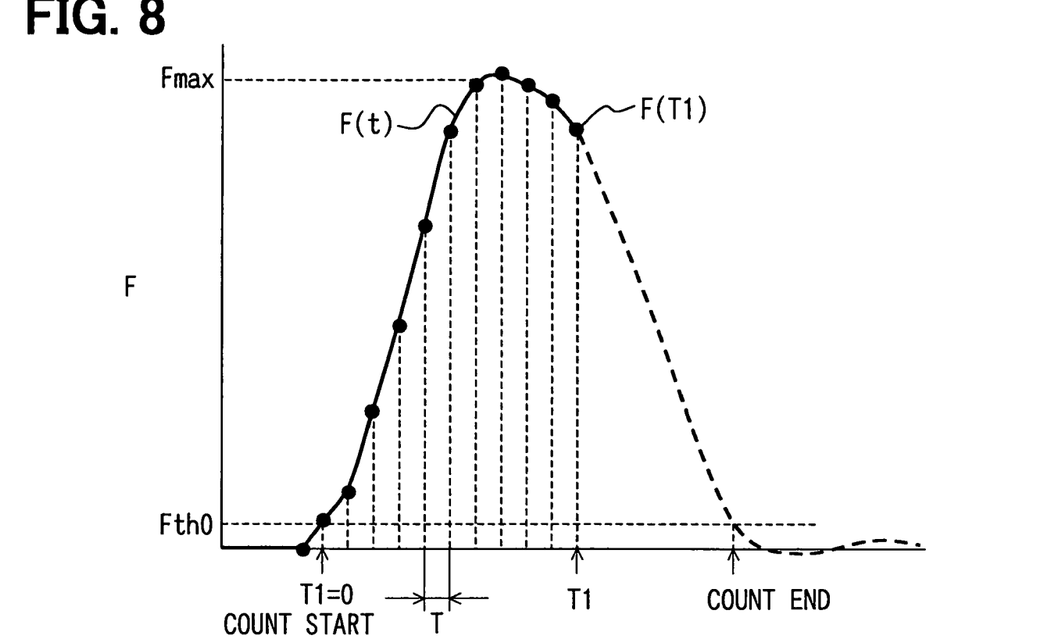
FIG. 8 is a graph showing a waveform of a collision load detected in the first embodiment.

A collision load waveform at collision is presumed as a simple single-peaked pattern as shown in FIG. 8. When the this-time value F(T1) becomes larger than the previous value, the previous value can be determined as the maximum value Fmax. Here, a high-frequency noise component can be removed from a collision load read from the collision load sensor 2 using a given low-path filter.

Thus, the above-described process obtains an elapsed time T1, the one-time integration value, and the two-time integration value. Here, the elapsed time T1 is a period from when the this-time value F(T1) of the collision load exceeds the threshold value Fth0 (at T1=0) through when the this-time value F(T1) undergoes the maximum load Fmax to when the this-time value F(T1) decreases to the threshold value Fth0. Mathematical formulas for the one-time and two-time integration values are shown at Steps S110, S112 in FIG. 7, respectively. Here, the one-time integration value of the this-time value F(T1) of the collision load represents an impulse due to a collision of an object.

Next, at Step S124, a mass of the collision object is computed by dividing the one-time integration value by a function value ((1+e)/V). At Step S126, it is determined whether the computed mass corresponds to a pedestrian. When the object is determined to be not corresponding to a pedestrian, the object is determined to be an object other than a pedestrian at Step S128, returning the process to a main routine. Namely, since the impulse equals to a variation of kinetic momentum, a mass of a collision object can be computed by a known collision speed V and a known rebound speed e×V (e: constant, rebound coefficient) using a mathematical formula as follows:

$$\int F(t)dt = M \times V + M \times e \times V \quad \text{Formula 1:}$$

The Inventors found from experiments that a rebound coefficient e is much affected by a property of a bumper, but less affected by a collision object. When a bumper of a vehicle collides with a pedestrian or metal-made object (e.g., fence disposed in a construction site), a rebound coefficient of the bumper can be practically used as the constant e. The rebound coefficient of the bumper is approximately between 0.4 and 0.6 although the coefficient is varied depending on the kind of the bumper. As a result, a mass of the collision object is obtained by modifying Formula 1 to Formula 2 as follows:

Formula 2:

$$M = \frac{\int_{t=0}^{t=T1} F(t)dt}{(1+e) \times V}$$

When the computed mass M falls within a given range corresponding to a pedestrian at Step S126, the process advances to Step S130.

Figure 7:
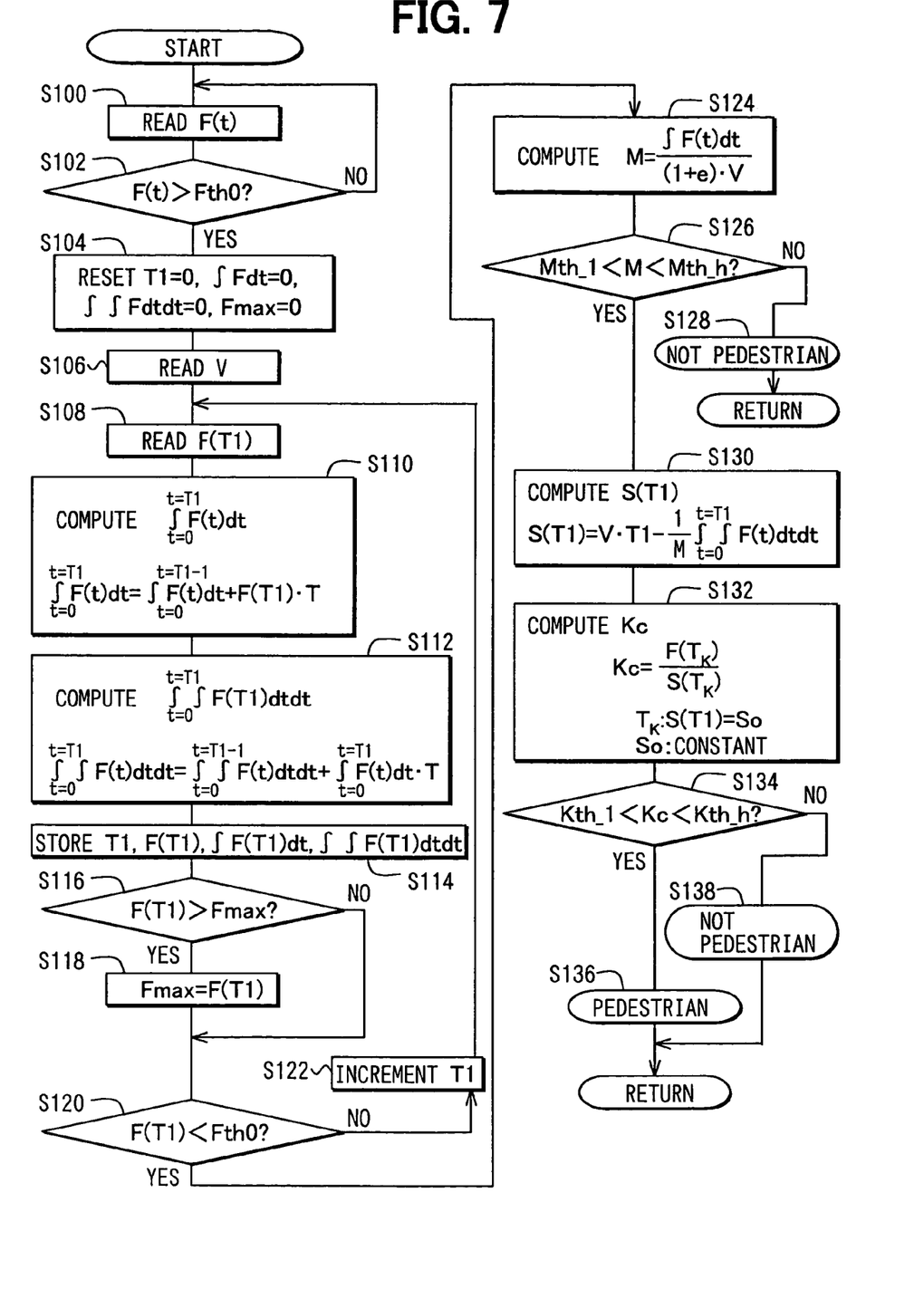
FIG. 7 is a flow chart diagram showing a pedestrian determining process according to the first embodiment.

At Step S130, a collision stroke S(T1) is computed based on a formula shown at S130 in FIG. 7 using the two-time integration value, vehicle speed, and mass. The collision stroke S(T1) is a parameter that represents, of the collision object and bumper, a total deformation distance at collision in a collision direction. The stoke S(T1) is obtained by the following: computing the certain product of the vehicle speed V and the timer count T1; computing the certain quotient when the two-time integration value is divided by the mass M; finally, obtaining the stroke as the difference when the certain quotient is subtracted from the certain product. At Step S132, rigidity Kc is obtained using a formula shown at S132 in FIG. 7.

In this embodiment, of the collision object, the rigidity Kc being an important parameter is defined as a value obtained as the quotient when the collision load F(t) is divided by the deformation stroke S(t) of the collision object at collision, as follows:

Formula 3:

$$K = \frac{F(t)}{S(t)}$$

Here, the deformation stroke S(t) is the sum of the deformation stroke So(t) of the collision object and the deformation stroke Sb(t) of the bumper, as follows:

$$S(t) = So(t) + Sb(t) \quad \text{Formula 4:}$$

The deformation stroke S(t) is obtained from the collision load F(t) and the mass M of the collision object. The quotient when F(t) is divided by the mass M represents an acceleration derived from the collision, so that the deformation stroke is obtained by integrating the acceleration in two times. Therefore, the deformation stroke can be represented by the two-time integration value, collision acceleration V, and mass M as follows:

Formula 5:

$$S(T1) = V \times T1 - \frac{1}{M} \int_{t=0}^{t=T1} \int F dt \, dt$$

Since the two-time integration value of F(T1), the this-moment time T1, the collision speed V, and the mass M are stored at Step S114 as a set in the internal registers, the deformation stroke S(t) is obtained with respect to time-series. Accordingly, a time-series relationship between the collision load F(t) and deformation stroke S(t) can be obtained. In practice, it is troublesome that the rigidity Kc of the collision object being the quotient when F(t) is divided by the deformation stroke S(t) is computed every time (each stroke value). In this embodiment, the rigidity of the collision object is obtained at Step S132 by the following: specifying the count time Tk of the timer T1 when the value S(T1) of the deformation stroke S(t) reaches a given value So; reading out the value F(Tk) of the collision load F(t) at the count time Tk from the internal register; finally, obtaining the rigidity being the quotient when the value F(Tk) is divided by the So of the deformation stroke S(T1). The computed rigidity Kc of the collision object is inherently a combined value of the rigidity of the collision object and the rigidity of the bumper; however, the rigidity of the bumper is peculiar to a kind of the bumper. Therefore, the rigidity Kc obtained at Step S132 can be recognized as the rigidity of the collision object. Otherwise, when the rigidity Kb of the bumper is assumed to be a known constant, the rigidity Ko of the collision object can be also obtained by the following formula:

$$Ko = (Kb - Kc)/(Kc \times Kb) \quad \text{Formula 6:}$$

Next, at Step S134, it is determined whether the rigidity Kc (or Ko) of the collision object falls within a region corresponding to that of a pedestrian. When the rigidity Kc is determined to be falling within the region, the collision object is determined to be a pedestrian at Step S136. Otherwise, the collision object is determined to be an object other than a pedestrian at Step S138, which returns the process to the main routine. Here, it is preferable that the collision object is determined to be a pedestrian, in practice, when the region of Kc is from 30 N/mm to 150 N/mm, while the collision object is determined to be an object other than a pedestrian when Kc is outside the foregoing region. Namely, at S134 in FIG. 8, Kth_1 can be equal 30, while Kth_h can be equal 150.

The rigidity of the collision object is a parameter indicating difficulty in deformation at collision occurrence. A pedestrian or person is much different from other collision objects in the rigidity. Namely, determining the collision object based on the rigidity of the collision object enables proper determination whether the collision object is a pedestrian or not. For instance, when a result from the determination is used for controlling driving of the pedestrian protecting device, mis-operation of the pedestrian protecting device can be prevented.

In the above-described embodiment, a mass and rigidity of a pedestrian can be computed only from outputs from a collision load sensor and a vehicle speed sensor that are conventionally used for determining a pedestrian, without using other-sensors. Since the pedestrian determining is executed based on the computed mass and rigidity, a simple structure for the pedestrian determining having high accuracy can be achieved.

Modification

In the above embodiment, the mass and the rigidity of the collision object are separately determined whether they fall within the regions corresponding to a pedestrian, respectively. However, the pedestrian determining can be also performed by previously preparing a map showing a pedestrian range using the mass and rigidity.

Second Embodiment

Pedestrian determining according to a second embodiment will be explained with reference to FIG. 9.

In the first embodiment, the one-time integration value and the two-time integration value continue to be computed until the this-time value F(T1) decreases to a threshold value Fth0, which is used for determining of existence or not existence of the collision at Step S120. However, after the collision load exceeds the maximum value Fmax, computing the one-time integration value and the two-time integration value is not continuously necessary. Namely, computing the one-time integration value and the two-time integration value can be finished at a certain timing when the collision load F(t) decreases to a certain level after exceeding the maximum load Fmax. The mass and rigidity can be estimated by using the data obtained up to the certain timing.

Figure 9:
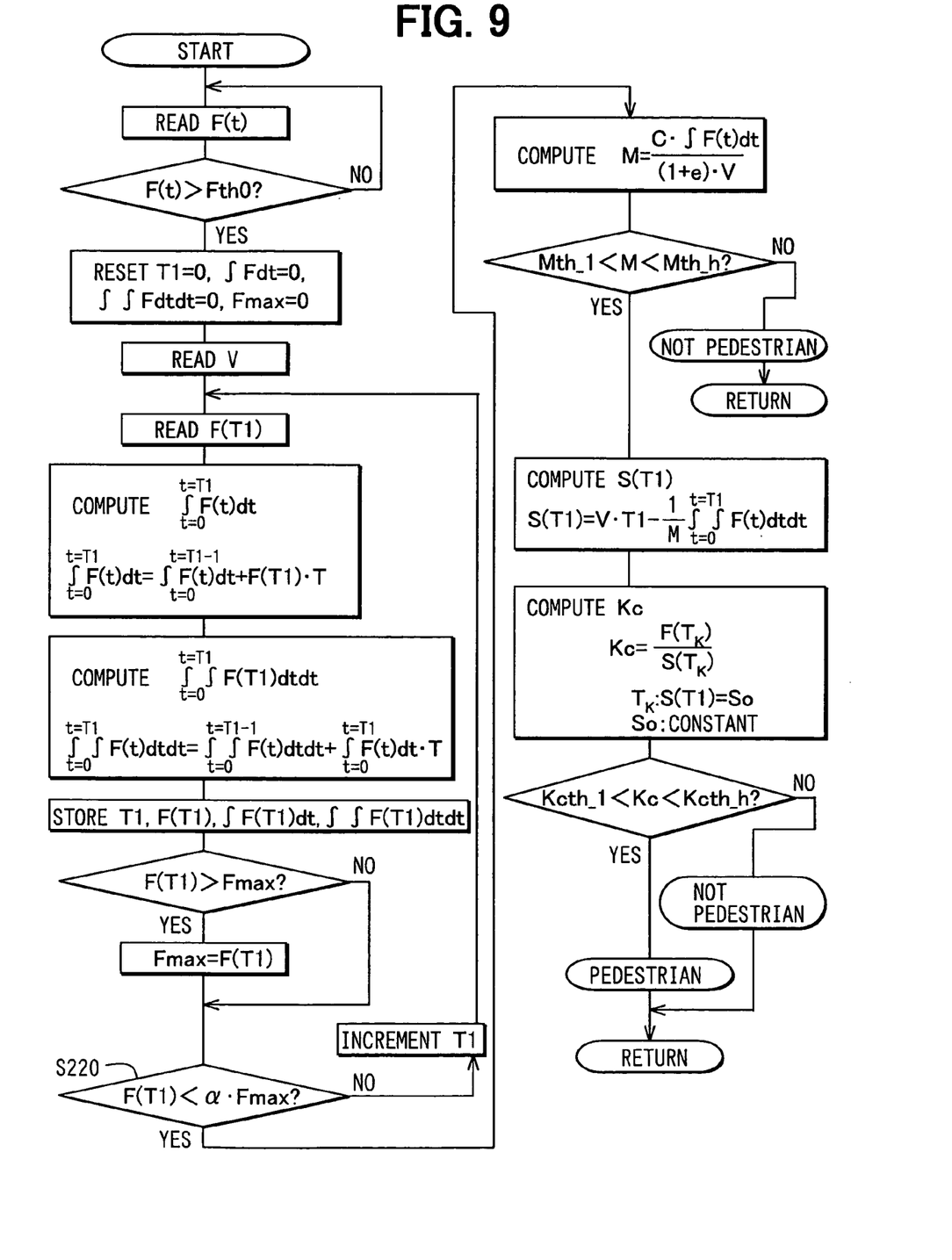
FIG. 9 is a flow chart diagram showing a pedestrian determining process according to a second embodiment.
Figure 10:
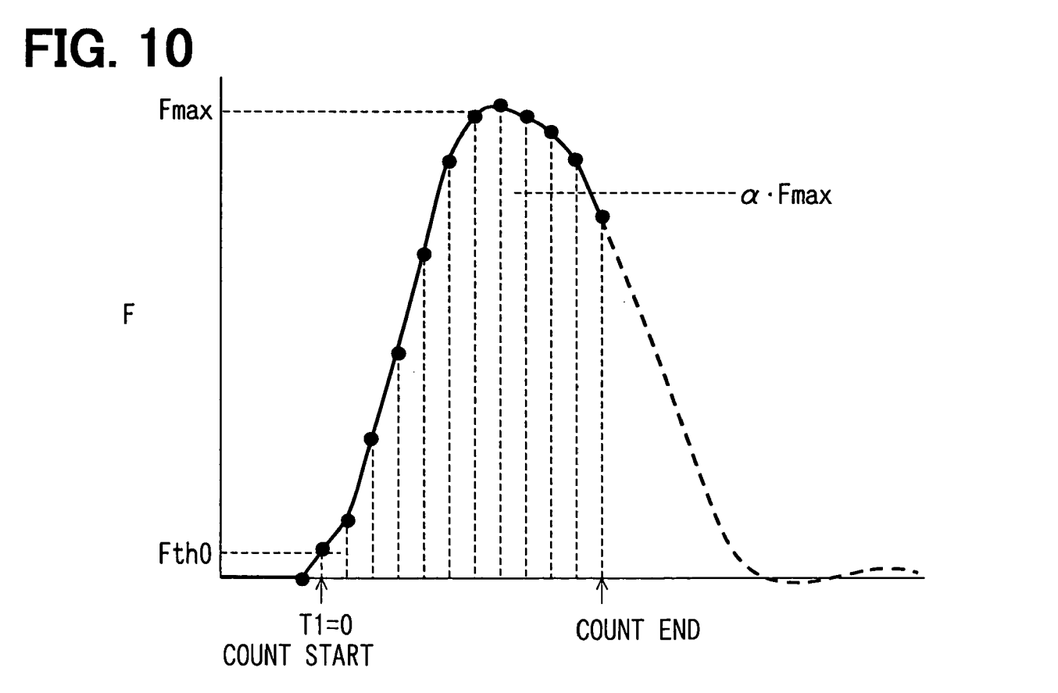
FIG. 10 is a graph showing a waveform of a collision load detected in the second embodiment.

In this case, Step S220 in FIG. 9 is adopted instead of Step S120 in FIG. 7. Computing the one-time integration value, two-time integration value, and this-time value F(T1) is finished at a timing when the collision load F(t) decreases to a value of the product of the maximum load Fmax and a given ratio $\alpha$ (preferably 0.3 to 0.9) after exceeding the maximum load Fmax. This shortens the necessary computing period.

Here, in this case, the one-time integration value of the collision load is a part of the impulse, the computed value of the mass M becomes smaller than the real value of the mass M. However, the inventors found that, when the computed value is corrected by a given correction constant, the corrected value has only few errors, generating no practical problem. For instance, at $\alpha=0.9$, a correction constant C being 1.5 can correct the value properly. The constants $\alpha$, C can be obtained by experiments with respect to a bumper.

Third Embodiment

Figure 11:
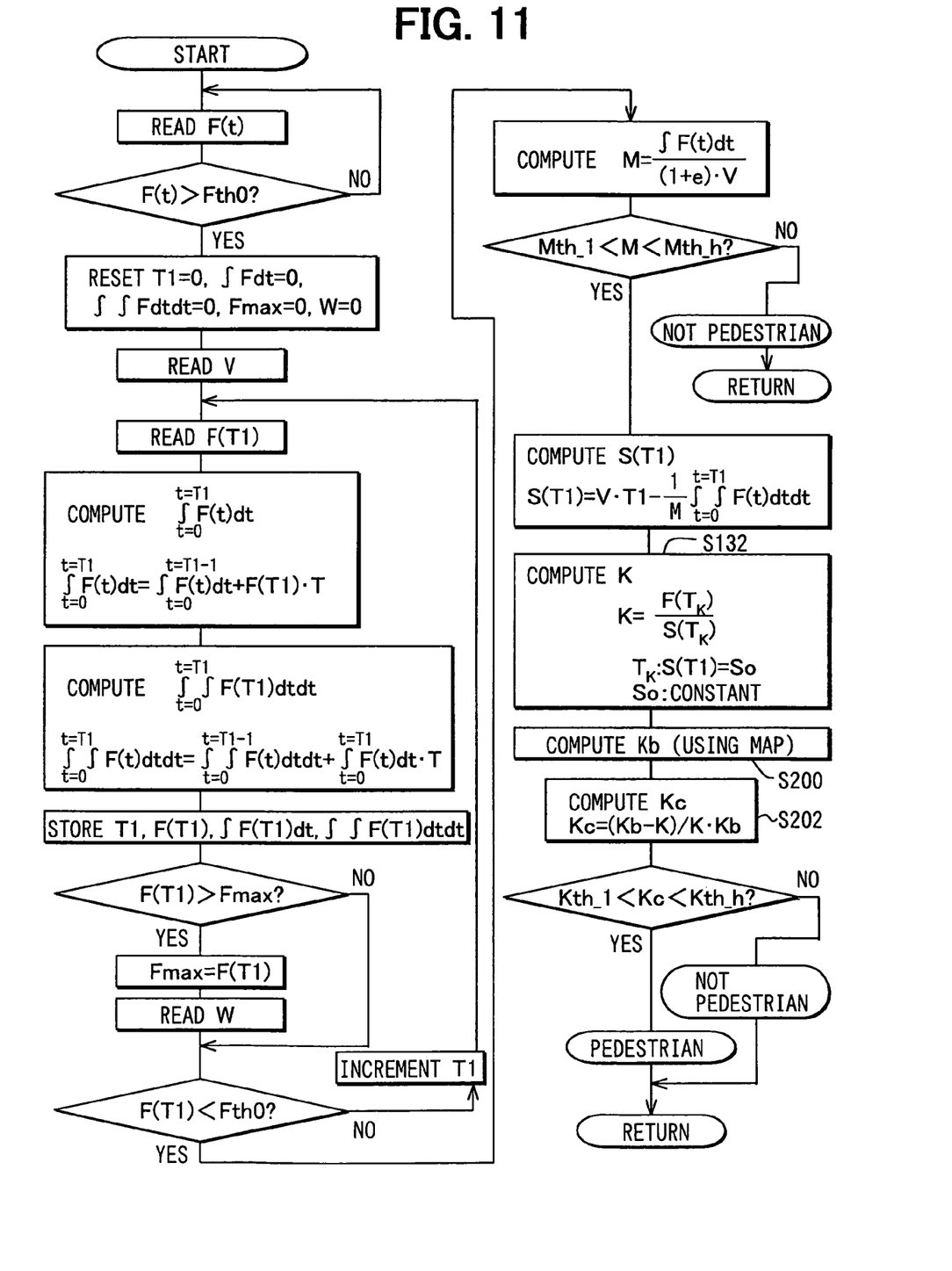
FIG. 11 is a flow chart diagram showing a pedestrian determining process according to a third embodiment.

In this embodiment, rigidity Kc of a collision object is accurately computed. For this purpose, as shown in FIG. 11, the flow chart in FIG. 7 adds Steps S200, S202. At Step S200, collision rigidity Kb of a bumper is computed, while, at Step S202, collision rigidity Kc of a collision object is computed from the collision rigidity Kb of the bumper and combined collision rigidity K. Step S132 in FIG. 11 corresponds to Step S132 in FIG. 7. Since the collision rigidity Kc of the collision object obtained in FIG. 7 is inherently combined collision rigidity K as explained above, Step S132 in FIG. 11 computes the combined collision rigidity K.

In this structure, a pedestrian can be more accurately determined using the rigidity. Further, a pedestrian region is assigned to a certain region in three dimensional space of the collision rigidity, mass, and collision width of the collision object. The pedestrian determining is performed by whether a data set of the computed collision rigidity, mass, and collision width falls within this certain region.

Figure 12:
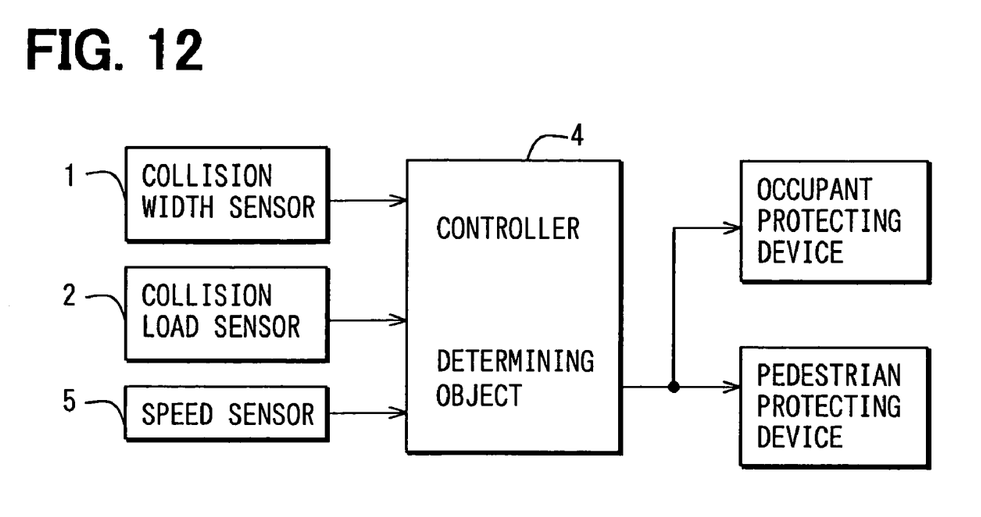
FIG. 12 is a block diagram showing a vehicular collision object determining system according to a third embodiment of the present invention.
Figure 13:
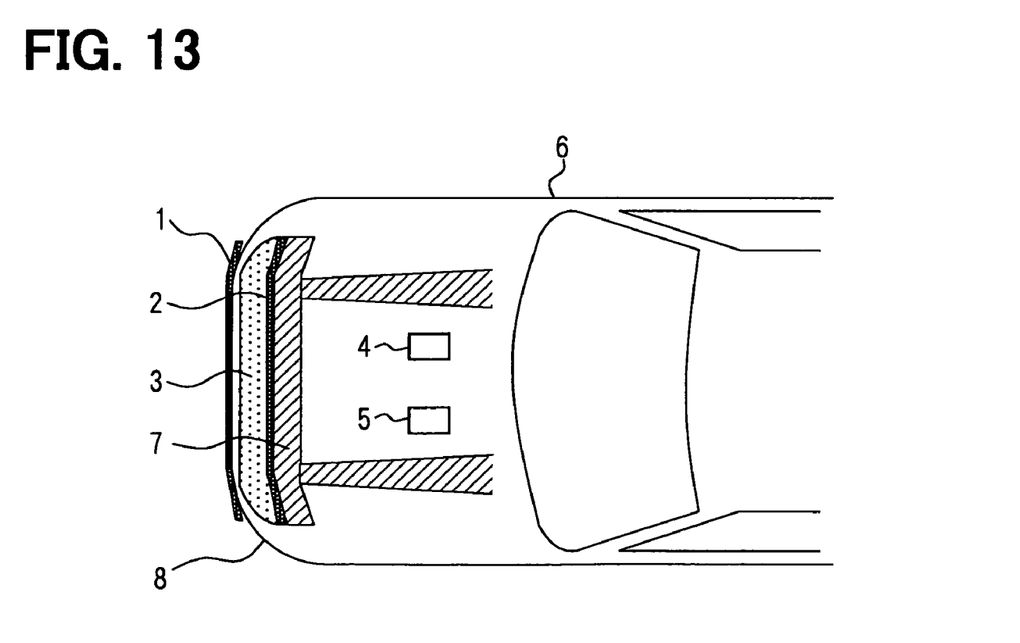
FIG. 13 is a schematic perspective view of a vehicle having a vehicular collision object determining system according to the third embodiment.
Figure 14:
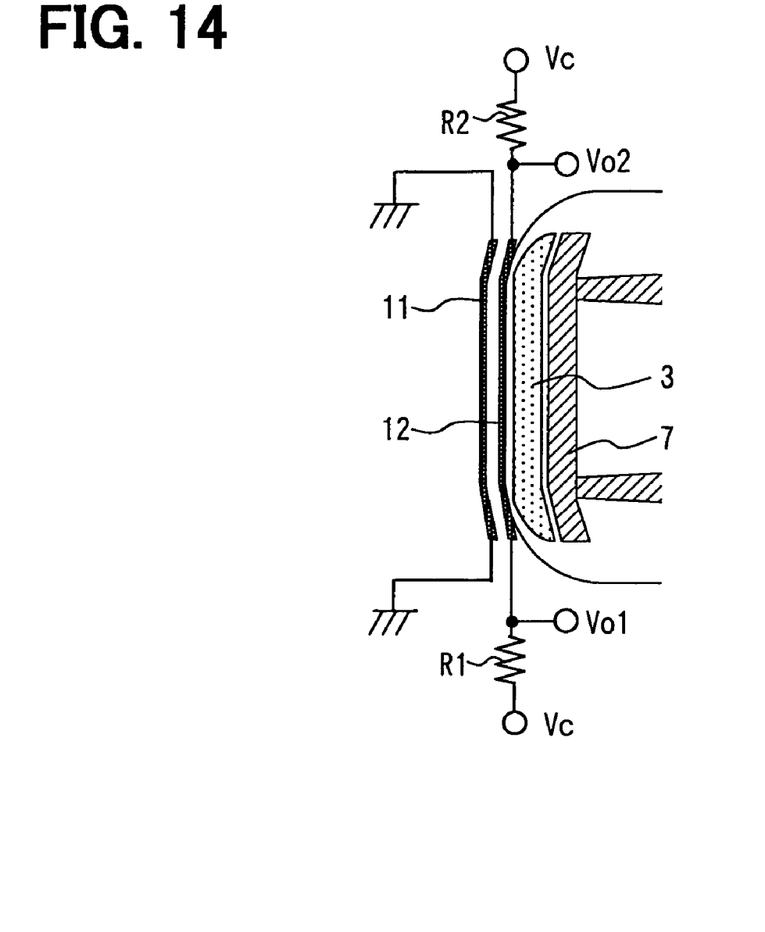
FIG. 14 is a circuit diagram showing an example of a width sensor according to the third embodiment.

Next, FIG. 12 shows a structure where the system includes a collision width sensor 1. FIG. 13 shows a schematic perspective view of an example of a vehicle having the collision width sensor 1. FIG. 14 shows a circuit diagram showing an example of a collision width sensor 1. It is preferable that, to accurately detect a collision width, the collision width sensor 1 is disposed on the front surface of a bumper cover 8 or in the rear surface of a bumper cover 8 (i.e. between the bumper cover 8 and the absorber 3).

The collision width sensor 1 detects a right-left (horizontal-directional) width of a contact portion of a collision object. The contact portion of the collision object means a contact portion between the collision object and the collision width sensor 1. An example of the collision width sensor 1 will be explained with reference to FIGS. 13, 14. The collision width sensor 1 includes a pair of current-conducting lines 11, 12 that are disposed as being extended in a vehicle-width direction with a given gap therebetween. The given gap is formed by fixing the current-conducting line 12 to the current-conducting line 12 via, e.g., an elastic member such as a rubber. The elastic member is formed of multiple elastic portions that are disposed in the vehicle-width direction with given intervals. Therefore, the current-conducting lines 11, 12 face directly each other in spaces formed between the adjoining elastic portions. When a collision is generated on the current-conducting line 11, the current-conducting line 11 is biased to move rearward and compresses the elastic portions. The current-conducting line 11 thereby makes direct contact with the current-conduction line 12. Further, when the collision is then removed, compression of the rubber is released and the current-conducting line 11 returns to the original position to be reused. The contact between the current-conducting lines 11, 12 requires a threshold collision load more than a given level to prevent mis-detection. In FIG. 14, a circuit can be exchangeable between the two current-conducting lines 11, 12. In this embodiment, the current-conducting line 11 has a negligible low resistance, while the current-conducting line 12 (or resistance line) has a given level resistance. Here, both can be exchangeable with each other. The current-conducting line 11 is grounded. By contrast, power source voltage Vc is applied to the current-conducting line 12 via resistances R1, R2 that are connected with the both ends of the resistance line 12, as shown in FIG. 14. Here, the power source voltage Vc can be applied to the current-conducting line 11, while the current-conducting line 12 can be grounded.

Figure 15:
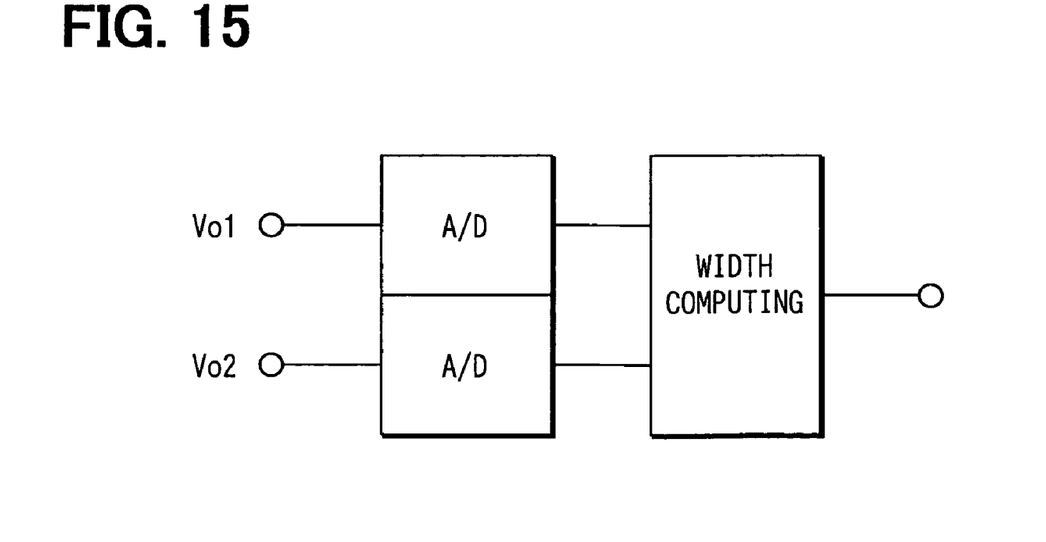
FIG. 15 is a block diagram showing an output processing circuit of a width sensor according to the third embodiment.

Thus, when a collision is not generated, voltages Vo1, Vo2 at connecting points of the resistances R1, R2 with the resistance line 12, respectively, remain at the power source voltage Vc. This indicates that no collision occurs. It is supposed that, in the vehicle-width direction of the current-conducting line 11, a region from a point P1 to a point P2 (disposed closer to the resistance R2 than the resistance P1) makes contact with the resistance line 12 due to occurrence of collision. The output voltage Vo1 becomes $Vc \times r1/(r1+R1)$) when r1 is a resistance value from the lower end in FIG. 14 to the point P1 in the resistance line 12. The output voltage Vo2 becomes $Vc \times (r2/(r2+R1))$ when r2 is a resistance value from the upper end in FIG. 14 to the point P2 in the resistance line 12. It is preferable that R1 and R2 are equal to each other. The output voltages Vo1, Vo2 are varied based on distances from both ends of the resistance line 12 to the corresponding ends of the collision region. These distances W1, W2 are thereby computed from a map that is previously memorized. The right-left width of the collision region can be computed by subtracting these W1, W2 from the entire length Wo of the resistance line 12. In this embodiment, as shown in FIG. 15, the output voltages Vo1, Vo2 are converted to digital signals by A/D converters to be sent to a width computing unit that is formed of a microcomputer that computes the above-described collision width (or contact width). The collision width is thereby computed and outputted as the digital signal.

Figure 16:
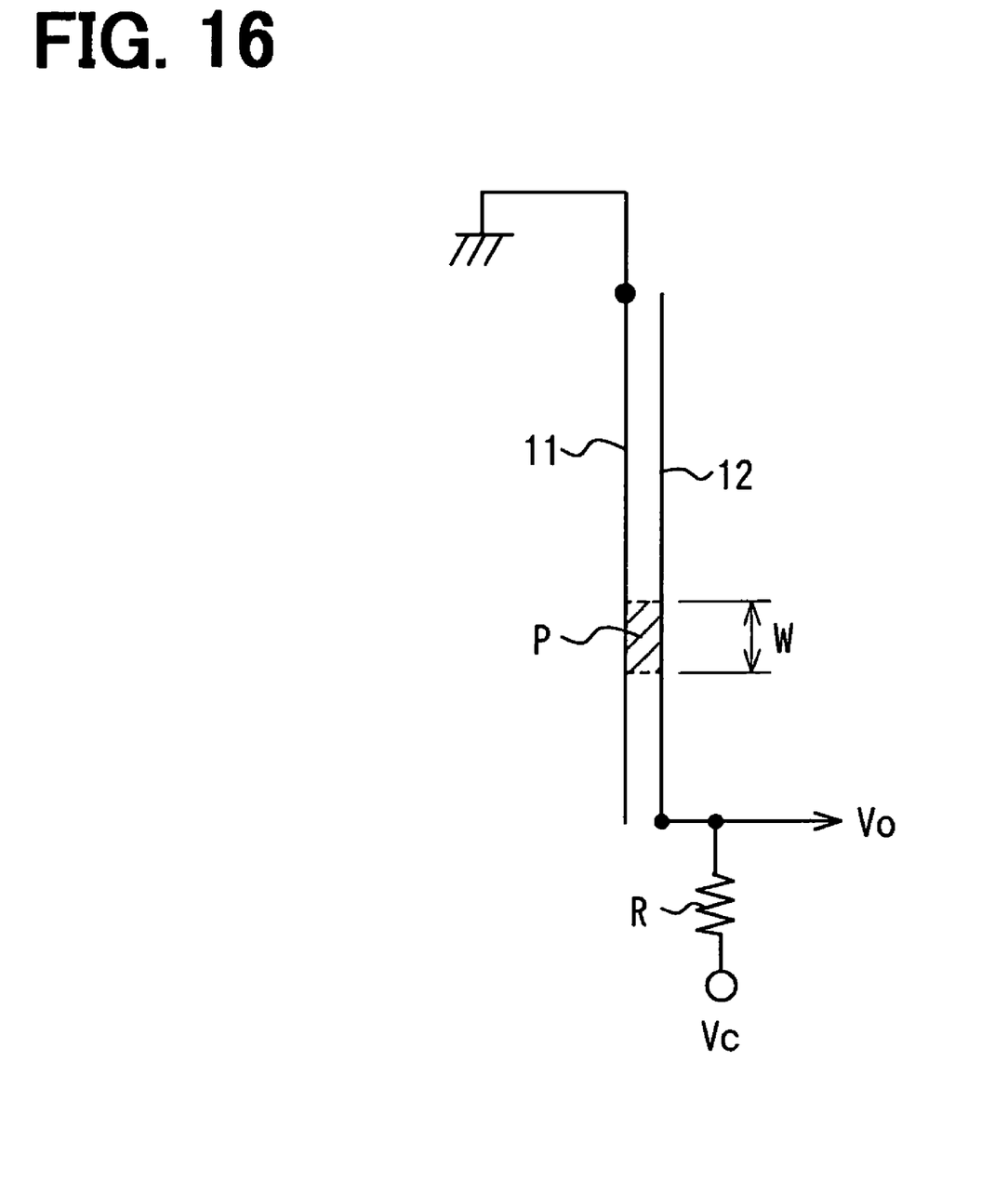
FIG. 16 is a diagram explaining a principle of computing a collision width in a width sensor according to the third embodiment.

A modification example of the collision width sensor 1 will be explained with reference to FIG. 16. In this example, current conducting lines 11, 12 are resistance lines that have equal resistance values, respectively. One end of the current-conducting line 11 is grounded, while power source voltage Vc is applied to one end of the current-conducting line 12 via a resistance element R, as shown in FIG. 16. Electric resistances of the current-conducting lines 11, 12 are r in their vehicle-width directions, respectively. When collision is not generated, an output voltage Vo equals Vc. When the current-conducting lines 11, 12 are contacted with each other at a very small point, the output voltage Vo becomes Vc×(r/(r+R)). Each of the entire lengths of the current-conducting lines 11, 12 is Wo. When a contact region P has a collision width W, the output voltage Vo becomes Vc×(r1/(r1+R)). Here, r1 is a resistance value of the current-conducting lines 11, 12, so that r1 is r×((Wo−W)/W). Namely, as the contact width increases, the output voltage Vo decreases from Vc×(r/(r+R)). Therefore, the collision width W can be computed from the output voltage Vo using a map that is previously memorized.

(Others)

In the above embodiments, whether a collision object is a pedestrian is determined based on a mass and rigidity of the collision object; however, it can be determined based on either of the mass and rigidity of the collision object.

As a collision load, a signal having correlation with the collision load can be also used instead of the collision load itself. As a mass or rigidity of a collision object, a signal having correlation with the mass or rigidity of the collision object can be also used instead of the mass or rigidity of the collision object itself. In addition to an analog signal, a step-wise signal or digital signal can be also used. The computing circuit (or unit) or determining circuit (or unit) can be formed by a hardware circuit including an analog circuit or digital circuit or by a micro-computer including software for computing data corresponding to the mass or rigidity by a given routine.

A mass of a pedestrian means a mass as a function of collision force that is applied to a collision load sensor in a bumper when the bumper collides with the pedestrian. Since the pedestrian has many joints, the mass does not need to be the quotient when the body weight is simply divided by gravity. The pedestrian mass can be 7 kg with respect to a child (around six years old), or 13 kg with respect to an averaged adult person when a height of a bumper is approximately 500 mm. The rigidity of a person is 50 N/mm to 140 N/mm according to a study result. Accordingly, when a mass and rigidity of a collision object is computed from a collision load and a collision speed, a threshold for determining can be specified based on the foregoing values. Discriminating a person from an object other than a person can be thereby enabled. In this invention, a physical parameter obtained as electricity quantity other than the mass or rigidity can be also used for determining.

It will be obvious to those skilled in the art that various changes may be made in the above-described embodiments of the present invention. However, the scope of the present invention should be determined by the following claims.

What is claimed is:

1. A vehicular collision object determining system mounted on a vehicle comprising:
    a collision load sensor that detects a collision load;
    a speed sensor that detects a vehicle speed of the vehicle;
    a computing unit that computes at least one of a mass and rigidity of a collision object based on at least outputs from the collision load sensor and the speed sensor; and
    a determining unit that determines whether the collision object is a pedestrian or not based on the at least one of the mass and the rigidity of the collision object,
    wherein the computing unit computes the mass of the collision object based on a vehicle speed when the collision object starts to collide with the vehicle and a one-time integration value that is obtained by integrating the collision load with respect to time in one time.

2. A vehicular collision object determining system mounted on a vehicle comprising:
    a collision load sensor that detects a collision load;
    a speed sensor that detects a vehicle speed of the vehicle;
    a computing unit that computes at least one of a mass and rigidity of a collision object based on at least outputs from the collision load sensor and the speed sensor; and
    a determining unit that determines whether the collision object is a pedestrian or not based on the at least one of the mass and the rigidity of the collision object,
    wherein the computing unit computes the rigidity of the collision object based on a vehicle speed when the collision object starts to collide with the vehicle, a one-time integration value that is obtained by integrating the collision load with respect to time in one time, and a two-time integration value that is obtained by integrating the collision load with respect to time in two times.

3. A vehicular collision object determining system mounted on a vehicle comprising:
    a collision load sensor that detects a collision load;
    a speed sensor that detects a vehicle speed of the vehicle;
    a computing unit that computes at least one of a mass and rigidity of a collision object based on at least outputs from the collision load sensor and the speed sensor; and
    a determining unit that determines whether the collision object is a pedestrian or not based on the at least one of the mass and the rigidity of the collision object,
    wherein the computing unit computes at least one of the mass and the rigidity of the collision object when the collision load decreases to a given ratio relative to a maximum after the collision load reaches the maximum.

4. A vehicular collision object determining system mounted on a vehicle comprising:
    a collision load sensor that detects a collision load;
    a speed sensor that detects a vehicle speed of the vehicle;
    a computing unit that computes at least one of a mass and rigidity of a collision object based on at least outputs from the collision load sensor and the speed sensor; and
    a determining unit that determines whether the collision object is a pedestrian or not based on the at least one of the mass and the rigidity of the collision object; and
    a width sensor that detects a collision width between the collision object and a bumper of the vehicle,
    wherein the computing unit computes the rigidity of the collision object based on the collision width, the mass of the collision object, a vehicle speed when the collision object starts to collide with the vehicle, and a two-time integration value that is obtained by integrating the collision load with respect to time in two times.

5. The vehicular collision object determining system of claim 4,
    wherein the width sensor is disposed in a vehicle-width direction on a front surface of a bumper cover of the vehicle.

6. The vehicular collision object determining system of claim 4, wherein the width sensor is disposed in a vehicle-width direction between a bumper cover of the vehicle and an absorber of the vehicle.

7. The vehicular collision object determining system of claim 1,
wherein the computing unit computes the mass of the collision object based on at least outputs from the collision load sensor and the speed sensor, and
wherein the determining unit determines whether the collision object is a pedestrian or not based on the computed mass of the collision object.

8. The vehicular collision object determining system of claim 1,
wherein the computing unit computes the rigidity of the collision object based on at least outputs from the collision load sensor and the speed sensor, and
wherein the determining unit determines whether the collision object is a pedestrian or not based on the computed rigidity of the collision object.

9. The vehicular collision object determining system of claim 1,
wherein the computing unit computes the mass and rigidity of the collision object based on at least outputs from the collision load sensor and the speed sensor, and
wherein the determining unit determines whether the collision object is a pedestrian or not based on the computed mass and rigidity of the collision object.

10. The vehicular collision object determining system of claim 1,
wherein the collision load sensor is disposed in a vehicle-width direction in front of a bumper reinforcement of the vehicle.

11. The vehicular collision object determining system of claim 1,
wherein the collision load sensor is disposed between a bumper reinforcement of the vehicle and a side member of the vehicle.

12. The vehicular collision object determining system of claim 2,
wherein the computing unit computes the mass of the collision object based on at least outputs from the collision load sensor and the speed sensor, and
wherein the determining unit determines whether the collision object is a pedestrian or not based on the computed mass of the collision object.

13. The vehicular collision object determining system of claim 2,
wherein the computing unit computes the rigidity of the collision object based on at least outputs from the collision load sensor and the speed sensor, and
wherein the determining unit determines whether the collision object is a pedestrian or not based on the computed rigidity of the collision object.

14. The vehicular collision object determining system of claim 2,
wherein the computing unit computes the mass and rigidity of the collision object based on at least outputs from the collision load sensor and the speed sensor, and
wherein the determining unit determines whether the collision object is a pedestrian or not based on the computed mass and rigidity of the collision object.

15. The vehicular collision object determining system of claim 2,
wherein the collision load sensor is disposed in a vehicle-width direction in front of a bumper reinforcement of the vehicle.

16. The vehicular collision object determining system of claim 2,
wherein the collision load sensor is disposed between a bumper reinforcement of the vehicle and a side member of the vehicle.

17. The vehicular collision object determining system of claim 3,
wherein the computing unit computes the mass of the collision object based on at least outputs from the collision load sensor and the speed sensor, and
wherein the determining unit determines whether the collision object is a pedestrian or not based on the computed mass of the collision object.

18. The vehicular collision object determining system of claim 3,
wherein the computing unit computes the rigidity of the collision object based on at least outputs from the collision load sensor and the speed sensor, and
wherein the determining unit determines whether the collision object is a pedestrian or not based on the computed rigidity of the collision object.

19. The vehicular collision object determining system of claim 3,
wherein the computing unit computes the mass and rigidity of the collision object based on at least outputs from the collision load sensor and the speed sensor, and
wherein the determining unit determines whether the collision object is a pedestrian or not based on the computed mass and rigidity of the collision object.

20. The vehicular collision object determining system of claim 3,
wherein the collision load sensor is disposed in a vehicle-width direction in front of a bumper reinforcement of the vehicle.

21. The vehicular collision object determining system of claim 3,
wherein the collision load sensor is disposed between a bumper reinforcement of the vehicle and a side member of the vehicle.

22. The vehicular collision object determining system of claim 4,
wherein the computing unit computes the mass of the collision object based on at least outputs from the collision load sensor and the speed sensor, and
wherein the determining unit determines whether the collision object is a pedestrian or not based on the computed mass of the collision object.

23. The vehicular collision object determining system of claim 4,
wherein the computing unit computes the rigidity of the collision object based on at least outputs from the collision load sensor and the speed sensor, and
wherein the determining unit determines whether the collision object is a pedestrian or not based on the computed rigidity of the collision object.

24. The vehicular collision object determining system of claim 4,
wherein the computing unit computes the mass and rigidity of the collision object based on at least outputs from the collision load sensor and the speed sensor, and
wherein the determining unit determines whether the collision object is a pedestrian or not based on the computed mass and rigidity of the collision object.

25. The vehicular collision object determining system of claim 4, wherein the collision load sensor is disposed in a vehicle-width direction in front of a bumper reinforcement of the vehicle.

26. The vehicular collision object determining system of claim 4, wherein the collision load sensor is disposed between a bumper reinforcement of the vehicle and a side member of the vehicle.

* * * * *